(12) United States Patent
Tong et al.

(10) Patent No.: US 9,161,324 B2
(45) Date of Patent: Oct. 13, 2015

(54) METHOD OF REPORTING PHASE OFFSETS, USER EQUIPMENT AND TRANSMISSION POINT DEVICE USING THE METHOD

(75) Inventors: Hui Tong, Beijing (CN); Masayuki Hoshino, Kanagawa (JP); Akihiko Nishio, Osaka (JP); Ming Xu, Beijing (CN); Daichi Imamura, Beijing (CN)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 191 days.

(21) Appl. No.: 14/123,271

(22) PCT Filed: Jun. 30, 2011

(86) PCT No.: PCT/CN2011/076641
§ 371 (c)(1),
(2), (4) Date: Dec. 2, 2013

(87) PCT Pub. No.: WO2013/000146
PCT Pub. Date: Jan. 3, 2013

(65) Prior Publication Data
US 2014/0119362 A1 May 1, 2014

(51) Int. Cl.
*H04W 56/00* (2009.01)
*H04L 27/00* (2006.01)
*H04L 27/34* (2006.01)
*H04W 24/10* (2009.01)

(52) U.S. Cl.
CPC ....... *H04W 56/0035* (2013.01); *H04L 27/0008* (2013.01); *H04L 27/0012* (2013.01); *H04L 27/3472* (2013.01); *H04W 24/10* (2013.01)

(58) Field of Classification Search
None
See application file for complete search history.

(56) References Cited

U.S. PATENT DOCUMENTS

| 6,430,232 | B1 | 8/2002 | Patire |
| 7,953,033 | B2 | 5/2011 | Baker et al. |
| 2004/0005017 | A1* | 1/2004 | Borowski et al. ............. 375/329 |
| 2009/0059830 | A1 | 3/2009 | Baker et al. |
| 2009/0097452 | A1* | 4/2009 | Gogic ........................... 370/331 |
| 2010/0027456 | A1 | 2/2010 | Onggosanusi et al. |
| 2011/0312339 | A1* | 12/2011 | Kuningas et al. .......... 455/456.1 |
| 2013/0143577 | A1* | 6/2013 | Chiu et al. .................... 455/442 |

FOREIGN PATENT DOCUMENTS

| CN | 101043640 A | 9/2007 |
| CN | 101917381 A | 12/2010 |

(Continued)

OTHER PUBLICATIONS

R1-110743, 3GPP TSG RAN WG1 Meeting #64, Samsung, Preliminary CoMP JP results for Homogenous Networks, Feb. 21, 2011.

(Continued)

*Primary Examiner* — Min Jung
(74) *Attorney, Agent, or Firm* — Pearne & Gordon LLP (57) ABSTRACT

A transmission point device, user equipment, and method of reporting phase offsets between signals received from a serving cell and neighbor cells in a communication system are disclosed. The method comprises steps of: quantizing the phase offsets using a predetermined number of bits; utilizing another bit to indicate constellation of the phase offsets; reporting the quantized phase offsets and the constellation to transmission point. The present disclosure may improve the signal combining gain from multiple transmission points with minimum overhead increasing.

18 Claims, 7 Drawing Sheets

(56) References Cited

FOREIGN PATENT DOCUMENTS

| EP | 1024633 A2 | 8/2000 |
| JP | 2007-518338 A | 7/2007 |

OTHER PUBLICATIONS

International Search Report for Application No. PCT/CN2011/076641 dated Apr. 5, 2012.

* cited by examiner

|   | 1 | j | -1 | -j |
|---|---|---|----|----|
| 1 | × |   | ×  |    |
| j |   | ○ |    | ○  |
| -1| × |   | ×  |    |
| -j|   | ○ |    | ○  |

| | 1 | (1+j)/√2 | j | (1+j)j/√2 | -1 | -(1+j)/√2 | -j | -(1+j)j/√2 |
|---|---|---|---|---|---|---|---|---|
| 1 | × | | × | | × | | × | |
| (1+j)/√2 | | ○ | | ○ | | ○ | | ○ |
| j | × | | × | | × | | × | |
| (1+j)j/√2 | | ○ | | ○ | | ○ | | ○ |
| -1 | × | | × | | × | | × | |
| -(1+j)/√2 | | ○ | | ○ | | ○ | | ○ |
| -j | × | | × | | × | | × | |
| -(1+j)j/√2 | | ○ | | ○ | | ○ | | ○ |

Fig.9

| | 1 | j | -1 | -j |
|---|---|---|---|---|
| 1 | | ○ | | ○ |
| j | × | | × | |
| -1 | | ○ | | ○ |
| -j | × | | × | |

|  | 1 | $(1+j)/\sqrt{2}$ | j | $(1+j)j/\sqrt{2}$ | −1 | $−(1+j)/\sqrt{2}$ | −j | $−(1+j)j/\sqrt{2}$ |
|---|---|---|---|---|---|---|---|---|
| 1 |  | ○ |  | ○ |  | ○ |  | ○ |
| $(1+j)/\sqrt{2}$ | × |  | × |  | × |  | × |  |
| j |  | ○ |  | ○ |  | ○ |  | ○ |
| $(1+j)j/\sqrt{2}$ | × |  | × |  | × |  | × |  |
| −1 |  | ○ |  | ○ |  | ○ |  | ○ |
| $−(1+j)/\sqrt{2}$ | × |  | × |  | × |  | × |  |
| −j |  | ○ |  | ○ |  | ○ |  | ○ |
| $−(1+j)j/\sqrt{2}$ | × |  | × |  | × |  | × |  |

| | 1 | j | −1 | −j |
|---|---|---|---|---|
| 1 | × | × | × | × |
| j | | | | |
| −1 | × | × | × | × |
| −j | | | | |

Fig. 14 A

| | 1 | j | −1 | −j |
|---|---|---|---|---|
| 1 | × | | × | |
| j | × | | × | |
| −1 | × | | × | |
| −j | × | | × | |

METHOD OF REPORTING PHASE OFFSETS, USER EQUIPMENT AND TRANSMISSION POINT DEVICE USING THE METHOD

TECHNICAL FIELD

The present disclosure relates to fields of Multi-Input and Multi-Output (MIMO), Beamforming, Feedback, Transmission point Cooperation, Coordinated Multiple Point Transmission (CoMP) technology, etc.

BACKGROUND

The cooperation between transmission points is an important means to mitigate inter-cell-interference in cellular systems, and it is being intensively discussed in the fourth generation of wireless communication system standardizations. One transmission method of transmission point cooperation is the joint transmission, namely a User Equipment (UE) would receive data signal from multiple transmission points.

Figure 1:
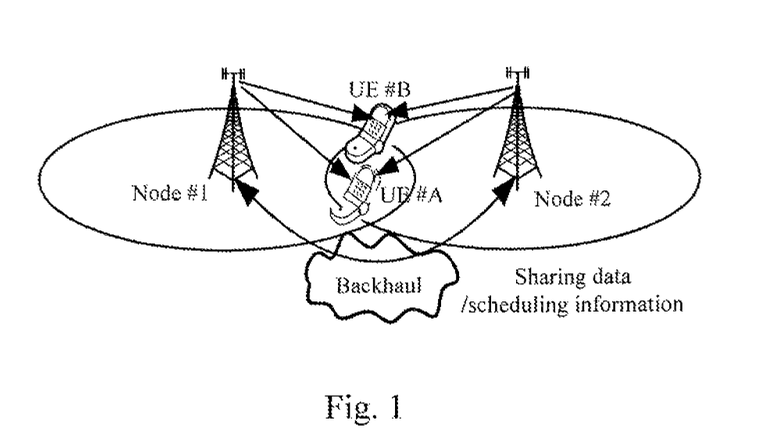
FIG. 1 is a diagram showing the operation for joint transmission between two transmission points.

FIG. 1 is a diagram showing the operation for joint transmission between two transmission points.

As shown in FIG. 1, the UE #A receives signals from the node (transmission point) #1 and node #2 at the same time, and the UE #B also receives signals from the node #1 and node #2 at the same time. The node #1 and node #2 share data and schedule information through backhaul.

To support the joint transmission, the UE needs to measure the channel from each transmission point, and then report those channels (i.e., Pre-coding Matrix Indices (PMI)/Channel Quality Indicator (CQI)/Ranking Indicator (RI) corresponding to each transmission point). Moreover, to ensure the signals from each transmission point are combined coherently at the UE (but not cancel each other), the UE also reports a phase offset (co-phasing factors) between two PMIs. The transmission point can apply the phase offset on the transmitted data signals to strengthen the signal power received at the UE. In general, the phase offset is quantized before being sent back to the transmission point, for example they are quantized to [1 −1] or [1 j −1 −j].

Moreover, in certain cellular environments, such as interference-limited environments, the UE may receive signals from more than two transmission points, e.g., three transmission points.

Figure 2A:
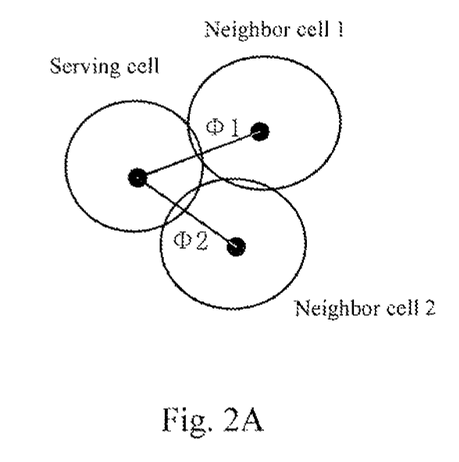
Figure 2B:
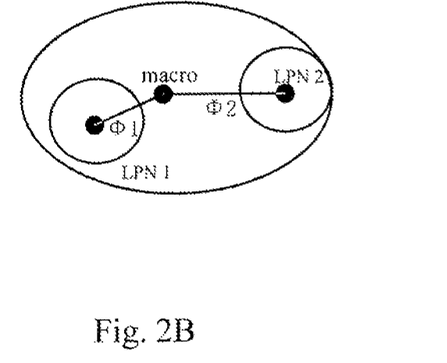

FIG. 2A and FIG. 2B are diagrams showing the reporting of multiple phase offsets, in which FIG. 2A shows a situation of homogeneous deployment, and FIG. 2B shows a situation of heterogeneous deployment.

As shown in FIG. 2A, a UE receives signals from three transmission points (cells). In this case, two phase offsets are needed, one of which corresponds to the phase offset $\phi 1$ between the serving cell and the neighbor cell 1, and the other of which corresponds to the phase offset $\phi 2$ between the serving cell and the neighbor cell 2.

When the UE reports multiple phase offsets, the signal combining gain from multiple transmission points may be cancelled due to the quantization. For example, two phase offsets with similar values may be quantized to completely different values.

Figure 3:
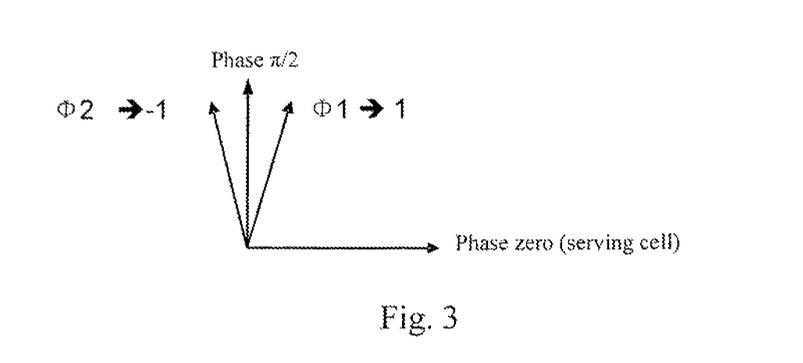
FIG. 3 shows an instance that two phase offsets with similar values are quantized to completely different values.

FIG. 3 shows an instance that two phase offsets with similar values are quantized to completely different values.

As shown in FIG. 3, both the phase offsets $\phi 1$ and $\phi 2$ are close to $\pi/2$, they have the similar values, and the corresponding signal combining gain should be high. However, if the quantization is [1 −1], for example $\phi 1$ is quantized to "1", and $\phi 2$ is quantized to "−1", the signal combining gain from the multiple transmission points are zero since $\phi 1$ and $\phi 2$ are quantized to opposite values "1" and "−1".

Figure 4:
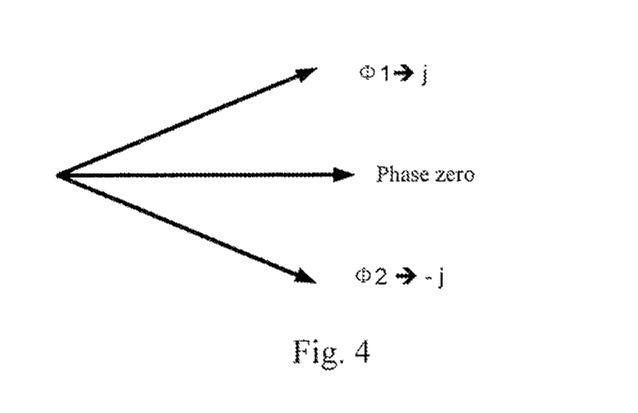
FIG. 4 shows another instance that two phase offsets with similar values are quantized to completely different values.

FIG. 4 shows an instance that two phase offsets with similar values are quantized to completely different values.

As shown in FIG. 4, the phase offsets $\phi 1$ and $\phi 2$ are close to phase zero, they have the similar values, and the corresponding signal combining gain should be high. However, if the quantization is [j −j], for example $\phi 1$ is quantized to "j", and $\phi 2$ is quantized to "−j", the signal combining gain from the multiple transmission points are zero since $\phi 1$ and $\phi 2$ are quantized to opposite values "j" and "−j".

When the transmission point applies the phase offsets in downlink transmission, the signals from the two neighbor cells may cancel each other due to such quantization.

SUMMARY OF THE DISCLOSURE

The present disclosure aims to solve the cancellation problem with minimum overhead increasing.

In one aspect of the present disclosure, there is provided a method of reporting phase offsets between signals received from a serving cell and neighbor cells in a communication system, comprising steps of: quantizing the phase offsets using a predetermined number of bits; utilizing another bit to indicate constellation of the phase offsets; and reporting the quantized phase offsets and the constellation to transmission point.

In another aspect of the present disclosure, there is provided a method of reporting phase offsets between signals received from a serving cell and neighbor cells in a communication system, comprising steps of: measuring channel quality indicators (CQI) of the neighbor cells; if CQI of a first neighbor cell is much higher than that of a second neighbor cell, quantizing the phase offset of the first neighbor cell using more bits than that of the second neighbor cell, and reporting the quantized phase offsets to a transmission point; if CQIs of the first and the second neighbor cells are close, quantizing the phase offsets of the first neighbor cell and the second neighbor cell using the same number of bits, utilizing another bit to indicate constellation of the phase offsets, and reporting the quantized phase offsets and the constellation to the transmission point.

In a further aspect of the present disclosure, there is provided a user equipment for reporting phase offsets between signals received from a serving cell and neighbor cells in a communication system, comprising: a quantization unit which quantizes the phase offsets using a predetermined number of bits, and utilizing another bit to indicate constellation of the phase offsets; a reporting unit which reports the quantized phase offsets and the constellation to transmission point.

In another further aspect of the present disclosure, there is provided a user equipment for reporting phase offsets between signals received from a serving cell and neighbor cells in a communication system, comprising: a measuring unit which measures channel quality indicators (CQI) of the neighbor cells; a quantization unit, which, if CQI of a first neighbor cell is much higher than that of a second neighbor cell, quantizes the phase offset of the first neighbor cell using more bits than that of the second neighbor cell; a reporting unit which reports the quantized phase offsets to a transmission point, wherein, if CQIs of the first neighbor cell and the second neighbor cell are close, the quantization unit quantizes the phase offsets of the first neighbor cell and the second neighbor cell using the same number of bits, and utilizes another bit to indicate constellation of the phase offsets, and the reporting unit reports the quantized phase offsets and the constellation to the transmission point.

In another further aspect of the present disclosure, there is provided a transmission point device, comprising: a receiving unit which receives information reported from user equipment, the information including the phase offsets between signals transmitted from the transmission point device and neighbor transmission point devices, and constellation of the phase offsets, wherein the phase offsets being quantized by using a predetermined number of bits, and the constellation being indicated by another bit; and a precoding unit which precodes signals to be transmitted to the user equipment with the quantized phase offsets and the constellation.

In another further aspect of the present disclosure, there is provided a transmission point device, comprising: a receiving unit which receives information reported from user equipment, the information including the phase offsets between signals transmitted from the transmission point device and neighbor transmission point devices, wherein if CQI of a first neighbor transmission point device is much higher than that of a second neighbor transmission point device, the phase offset of the first neighbor transmission point device being quantized by using more bits than that of the second neighbor transmission point device; and a precoding unit which precodes signals to be transmitted to the user equipment with the quantized phase offsets, wherein, if CQIs of the first and the second neighbor transmission point devices are close with each other, the phase offsets of the first and the second neighbor transmission point devices being quantized by using the same number of bits, and another bit being used to indicate constellation of the phase offsets, and the precoding unit precodes the signals to be transmitted to the user equipment with the quantized phase offsets and the constellation.

The present disclosure may improve the signal combining gain from multiple transmission points with minimum or not much overhead increasing.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2A and FIG. 2B are diagrams showing the multiple phase offsets reporting, in which FIG. 2A shows a situation of homogeneous deployment, and FIG. 2B shows a situation of heterogeneous deployment;

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

As mentioned in the background, when the transmission point applies the phase offsets in downlink transmission, the signals from the two neighbor cells may cancel each other due to the quantization. To solve the problem, one easy solution is to increase quantization granularity of both phase offsets, but the feedback overhead will be increased. Another easy solution is to increase quantization granularity for just one phase offset, for example φ1 is quantized to [1 −1] and φ2 is quantized to [1 j −1 −j]. However, the performance is not satisfactory at all circumstances. The reason is that the increased bit width is effective for only one phase offset but not for both/all phase offsets. Thus, a method that can balance bit assignment, e.g., one bit, to multiple phase offsets is preferred.

Further investigation reveals that, for different quantization constellations, the cancellation problem occurs at different values of phase offsets. For example, for [1 −1] quantization, the signal combining gain is cancelled when $\phi2$ and $\phi1$ are both around phase $\pi/2$, as shown in FIG. 3. On the other hand, for [j −j] quantization, the signal combining gain is cancelled when $\phi2$ and $\phi1$ are both around phase zero, as shown in FIG. 4.

Furthermore, the signal combining gain not only is cancelled at different values of $\phi2$ and $\phi1$ for different quantization, but also complements each other for different quantization.

Figure 5A:
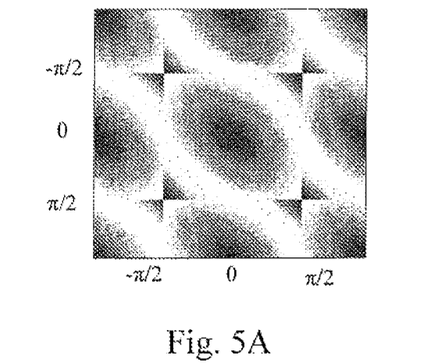
FIG. 5A and FIG. 5B show that signal combining gain is not only cancelled but also complements each other for different quantization.
Figure 5B:
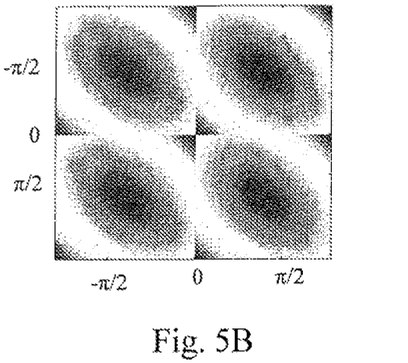

FIG. 5A and FIG. 5B show that signal combining gain not only is cancelled but also complements each other for different quantization.

FIG. 5A shows a situation of [1 −1] quantization. In the FIG. 5A, it is assumed that the horizontal direction indicates phase offset $\phi1$, and the vertical direction indicates phase offset $\phi2$. When $\phi2$ and $\phi1$ are around $\pi/2$, the signal combining gain is canceled each other, which is shown in light color. FIG. 5B shows a situation of [j −j] quantization. In the FIG. 5B, it is also assumed that the horizontal direction indicates $\phi1$, and the vertical direction indicates $\phi2$. When $\phi2$ and $\phi1$ are around $\pi/2$, the signal combining gain complements each other, which is shown in dark color.

The result implies that switching quantization based on the value of phase offsets may solve the cancellation problem. Consequently, the quantization needs to be notified to the transmission point because the quantization is not fixed anymore. Therefore, quantization constellation information may be considered an effective method to assign bit to multiple phase offsets.

First Embodiment

According to the first embodiment of the present disclosure, a communication system may comprise multiple cells (transmission points) and multiple user equipments. The cells may include a serving cell which provides service for the user equipment, as well as neighbor cells of the serving cell. Transmission point communicating with the user equipment can be considered as the serving cell or the neighbor cells.

Figure 6:
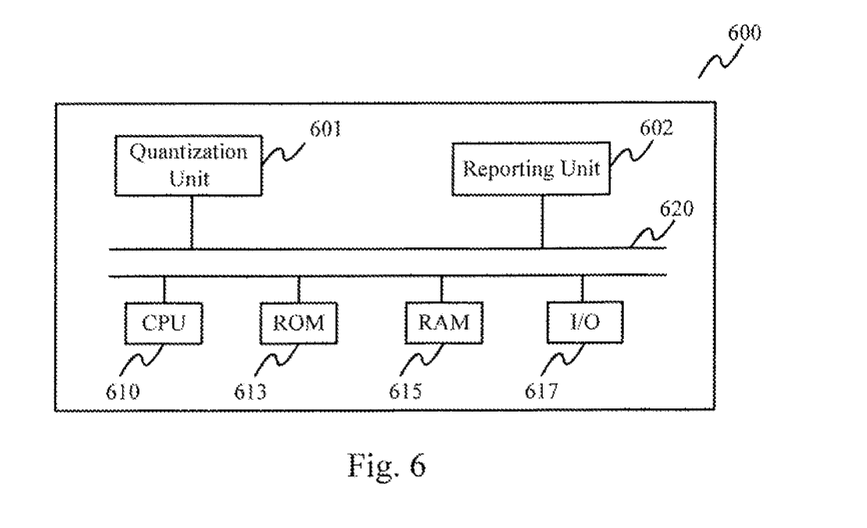
FIG. 6 is a diagram showing configuration of the user equipment according to the first embodiment of the present disclosure.

FIG. 6 is a diagram showing configuration of the user equipment according to the first embodiment of the present disclosure.

As shown in FIG. 6, the user equipment 600 which reports phase offsets between signals received from a serving cell and neighbor cells in a communication system may include a quantization unit 601 and a reporting unit 602. The quantization unit 601 quantizes the phase offsets using a predetermined number of bits, and utilizes another bit to indicate constellation of the phase offsets, and the reporting unit 602 reports the quantized phase offsets and the constellation to transmission point.

The user equipment 600 according to the first embodiment of the present disclosure may further include a CPU (Central Processing Unit) 610 for executing related programs to process various data and control operations of respective units of the user equipment 600, a ROM (Read Only Memory) 613 for storing various programs required for performing various process and control by the CPU 610, a RAM (Random Access Memory) 615 for storing intermediate data temporarily produced in the procedure of process and control by the CPU 610, and/or a I/O unit 617 for inputting and/or outputting various data with external apparatus outside the user equipment 600. The above quantization unit 601, reporting unit 602, CPU 610, ROM 613, RAM 615 and/or I/O unit 617 have respective ports to be interconnected via a data and/or command bus 620 and transfer data (signal) with one another.

Respective units as described above do not limit the scope of the present disclosure. According to one embodiment of the disclosure, the function of any of the above quantization unit 601 and reporting unit 602 may also be implemented by functional software in combination with the above CPU 610, ROM 613, RAM 615 and/or I/O unit 617 etc.

The second embodiment may improve the signal combining gain from multiple transmission points with minimum overhead increasing.

The detailed description will be given to the operations of respective units of the user equipment 600 below in combination with drawings.

Second Embodiment

According to the second embodiment of the present disclosure, the user equipment 600 reports two phase offsets by three bits, in which both the phase offsets are quantized to either [1 −1] or [j −j], each of the phase offsets uses one bit, and the third bit is used for indicating the constellation [1 −1] or [j −j].

Figure 7:
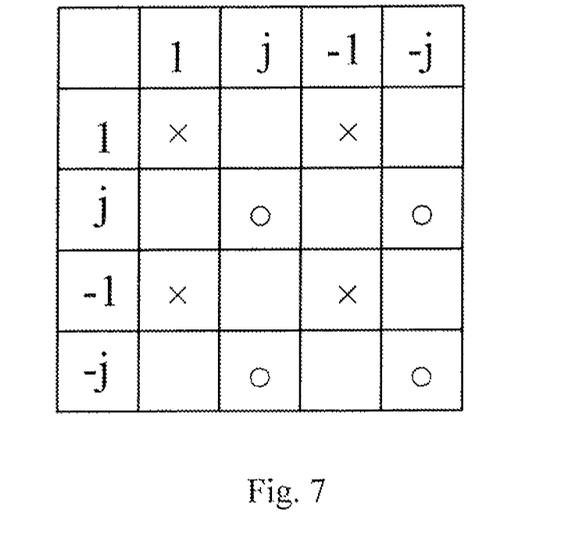
FIG. 7 is a table showing quantization and constellation of the phase offsets.

FIG. 7 is a table showing quantization and constellation of the phase offsets.

As shown in FIG. 7, it is assumed that the horizontal direction indicates phase offset $\phi1$, and the vertical direction indicates phase offset $\phi2$. In the second embodiment, both the phase offsets $\phi1$ and $\phi2$ are quantized to either [1 −1] or [j −j], and each of the phase offsets uses one bit. That is, if $\phi1$ is quantized to [1 −1] by one bit, $\phi2$ is quantized to [1 −1] by one bit too, as shown with the symbol "x" in FIG. 7. Similarly, if $\phi1$ is quantized to [j −j] by one bit, $\phi2$ is quantized to [j −j] by one bit too, as shown with the symbol "○" in FIG. 7.

The third bit is used for selecting the constellation [1 −1] or [j −j]. That is, the third bit is used for deciding which one of [1 −1] quantization and [j −j] quantization is used for both the phase offsets, depending on which quantization will yield better signal combining gain.

Figure 8A:
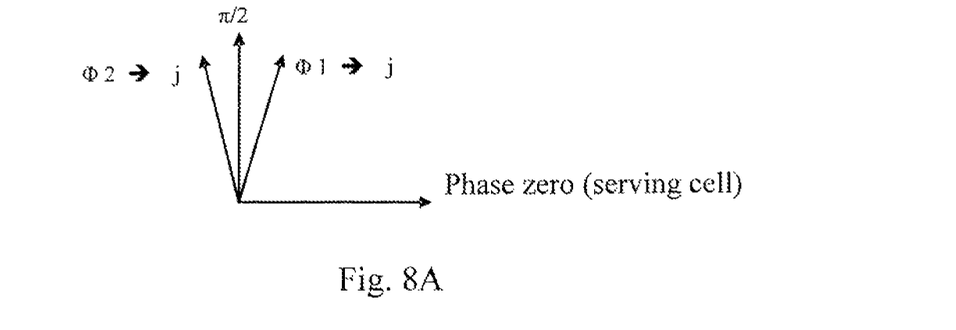
FIG. 8A and FIG. 8B show different instances that two phase offsets with similar values are quantized to complement each other.
Figure 8B:
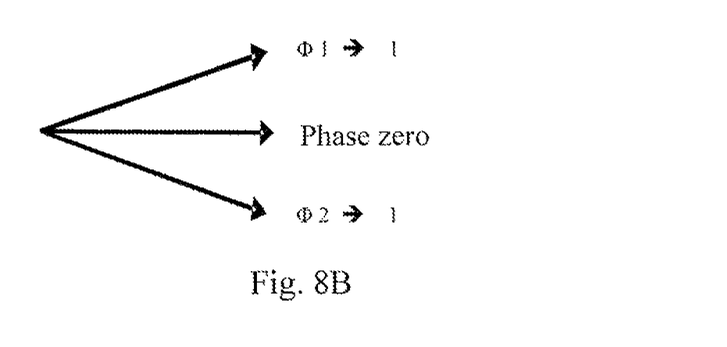

FIG. 8A and FIG. 8B show different instances that two phase offsets with similar values are quantized to complement each other.

As shown in FIG. 8A, both the phase offsets $\phi1$ and $\phi2$ are close to $\pi/2$, so they have the similar values. Instead of the [1 −1] quantization as shown in FIG. 3, the third bit is set to indicate that the [j −j] quantization is utilized here. In this case, the phase offset $\phi1$ is quantized to "j", and the phase offset $\phi2$ is also quantized to "j", the signal combining gain from the two transmission points are "2j" since both the phase offsets $\phi1$ and $\phi2$ are quantized to the same value "j".

As shown in FIG. 8B, both the phase offsets $\phi1$ and $\phi2$ are close to phase zero, so they have the similar values. Instead of the [j −j] quantization as shown in FIG. 4, the third bit is set to indicate that the [1 −1] quantization is utilized here. In this case, the phase offset $\phi1$ is quantized to "1", and the phase offset $\phi2$ is also quantized to "1", the signal combining gain from the two transmission points are "2" since both the phase offsets $\phi1$ and $\phi2$ are quantized to the same value "1".

Therefore, in the second embodiment, totally three bits are used to feedback the two phase offsets, in which one bit is used to quantize first phase offset, another bit is used to quantize second phase offset, and third bit is used for indicating the quantization constellation [1 −1] or [j −j]. Thereby, the second embodiment improves the signal combining gain from multiple transmission points with minimum overhead increasing.

Third Embodiment

According to the third embodiment of the present disclosure, the user equipment 600 reports two phase offsets by five bits, in which both the phase offsets are quantized to either [1 j −1 −j] or [1 j −1 −j]*(1 +j)/√2, each phase offset uses two bits, and the fifth bit is used for selecting the constellation [1 j −1 −j] or [1 j −1 −j]*(1 +j)/√2.

Figure 9:
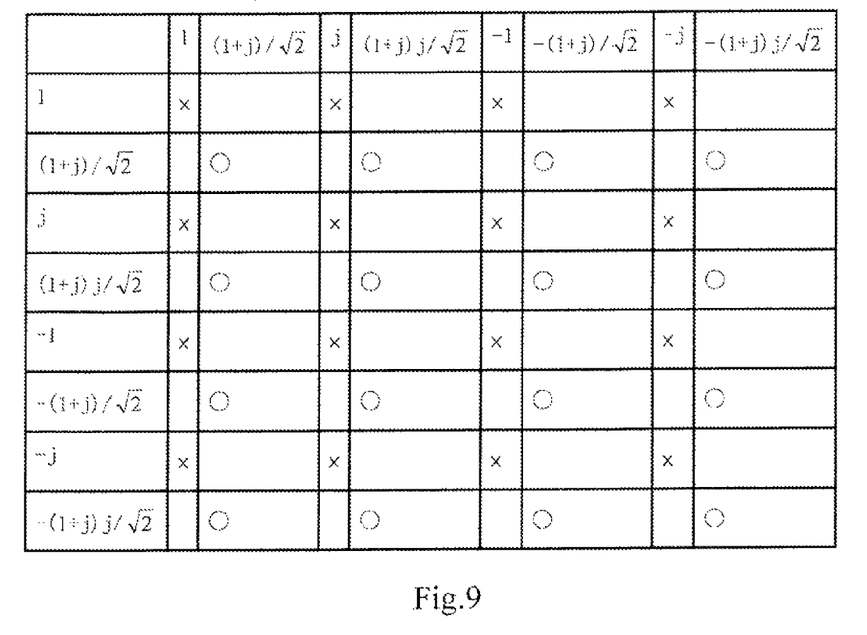
FIG. 9 is another table showing quantization and constellation of the phase offsets.

FIG. 9 is another table showing quantization and constellation of the phase offsets.

As shown in FIG. 9, it is assumed that the horizontal direction indicates phase offset φ1, and the vertical direction indicates phase offset φ2. In the third embodiment, both the phase offsets φ1 and φ2 are quantized to either [1 j −1 −j] or [1 j −1 −j]*(1 +j)/√2, and each of the phase offsets uses two bits. That is, if φ1 is quantized to [1 j −1 −j] by two bits, φ2 is quantized to [1 j −1 −j] by two bits too, as shown with the symbol "x" in FIG. 9. Similarly, if φ1 is quantized to [1 j −1 −j]*(1 +j)/√2 by two bits, φ2 is quantized to [1 j −1 −j]*(1 +j)/√2 by two bits too, as shown with the symbol "○" in FIG. 9.

The fifth bit is used for selecting the constellation [1 j −1 −j] or [1 j −1 −j]*(1 +j)/√2. That is, the fifth bit is used for deciding which one of [1 j −1 −j] quantization and [1 j −1 −j]*(1 +j)/√2 quantization is used for both the phase offsets, depending on which quantization will yield better signal combining gain.

In the third embodiment, totally five bits are used to feedback two phase offsets, in which two bits are used to quantize the first phase offset, another two bits are used to quantize the second phase offset, and fifth bit is used for selection of the quantization constellations of [1 j −1 −j] and [1 j −1 −j]*(1 +j)/√2. Thereby, the third embodiment much more improves the signal combining gain from multiple transmission points with not much overhead increasing.

Fourth Embodiment

According to the fourth embodiment of the present disclosure, the user equipment 600 reports three phase offsets by four bits, in which all the three phase offsets are quantized to either [1 −1] or [j −j], each of the phase offsets uses one bit, and the fourth bit is used for selecting the constellation [1 −1] or [j −j].

Specifically, it is assumed that the three phase offsets are φ1, φ2 and φ3 respectively. In the fourth embodiment, all the three phase offsets φ1, φ2 and φ3 are quantized to either [1 −1] or [j −j], and each phase offset uses one bit. That is, on one hand, if φ1 is quantized to [1 −1] by one bit, φ2 is quantized to [1 −1] by one bit, and φ3 is quantized to [1 −1] by one bit too. On the other hand, if φ1 is quantized to [j −j] by one bit, φ2 is quantized to [j −j] by one bit, and φ3 is quantized to [j −j] by one bit too.

The third bit is used for selecting the constellation [1 −1] or [j −j]. That is, the third bit is used for deciding which one of [1 −1] quantization and [j −j] quantization is used for the three phase offsets, depending on which quantization will yield better signal combining gain. The specific operation of the fourth embodiment is similar with that of the second embodiment, which will not be provided herewith in details.

Therefore, in the fourth embodiment, totally four bits are used to feedback three phase offsets, in which one bit is used to quantize the first phase offset, another bit is used to quantize the second phase offset, the third bit is used to quantize the third phase offset, and fourth bit is used for selection of the quantization constellations [1 −1] and [j −j]. Thereby, the fourth embodiment improves the signal combining gain from multiple transmission points with minimum overhead increasing.

Fifth Embodiment

According to the fifth embodiment of the present disclosure, the user equipment 600 reports three phase offsets by seven bits, in which all the three phase offsets are quantized to either [1 j −1 −j] or [1 j −1 −j]*(1 +j)/√2, each of the phase offsets uses two bits, and the seventh bit is used for selecting the constellation [1 j −1 −j] or [1 j −1 −j]*(1 +j)/√2.

Specifically, it is assumed that the three phase offsets are φ1, φ2 and φ3 respectively. In the fifth embodiment, all the three phase offsets φ1, φ2 and φ3 are quantized to either [1 j −1 −j] or [1 j −1 −j]*(1 +j)/√2, and each of the phase offsets uses two bits. That is, on one hand, if φ1 is quantized to [1 j −1 −j] by two bits, φ2 is quantized to [1 j −1 −j] by two bits, and φ3 is quantized to [1 j −1 −j] by two bits too. On the other hand, if φ1 is quantized to [1 j −1 −j]*(1 +j)/√2 by two bits, φ2 is quantized to [1 j −1 −j]*(1 +j)/√2 by two bits, and φ3 is quantized to [1 j −1 −j]*(1 +j)/√2 by two bits too.

The seventh bit is used for selecting the constellation [1 j −1 −j] or [1 j −1 −j]*(1 +j)/√2. That is, the seventh bit is used for deciding which one of [1 j −1 −j] quantization and [1 j −1 −j]*(1 +j)/√2 quantization is used for the three phase offsets, depending on which quantization will yield better signal combining gain. The specific operation of the fifth embodiment is similar with that of the third embodiment, which will not be provided herewith in details.

Therefore, in the fifth embodiment, totally seven bits are used to feedback three phase offsets, in which two bits are used to quantize the first phase offset, another two bits are used to quantize the second phase offset, the third two bits are used to quantize the third phase offset, and the seventh bit is used for selection of the quantization constellations [1 j −1 −j] and [1 j −1 −j]*(1 +j)/√2. Thereby, the fifth embodiment much more improves the signal combining gain from multiple transmission points with not much overhead increasing.

Sixth Embodiment

According to the sixth embodiment of the present disclosure, the user equipment 600 reports two phase offsets by three bits, in which one phase offset is quantized to [1 −1] by one bit, another phase offset is quantized to [j −j] by one bit, and the third bit is used for deciding which phase offset is quantized to [1 −1].

Figure 10:
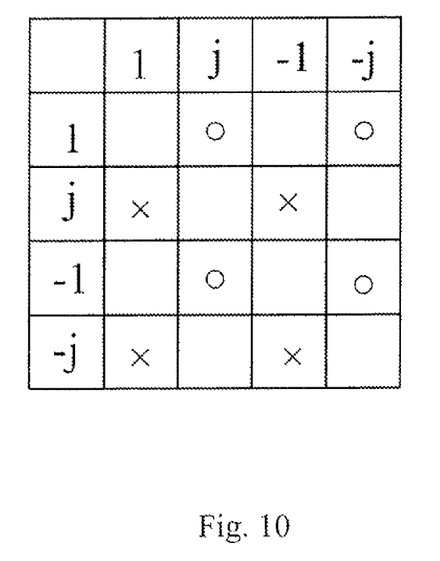
FIG. 10 is another table showing quantization and constellation of the phase offsets.

FIG. 10 is another table showing quantization and constellation of the phase offsets.

As shown in FIG. 10, it is assumed that the horizontal direction indicates phase offset φ1, and the vertical direction indicates phase offset φ2. In the sixth embodiment, if one phase offset such as φ1 is quantized to [1 −1] by one bit, the other phase offset such as φ2 is quantized to [j −j] by one bit, as shown with the symbol "x" in FIG. 10. On the other hand, if one phase offset such as φ2 is quantized to [1 −1] by one bit, the other phase offset such as φ1 is quantized to [j −j] by one bit, as shown with the symbol "○" in FIG. 10.

The third bit is used for deciding which phase offset is quantized to [1 −1]. That is, the third bit is used for deciding which one of [1 −1] quantization and [j −j] quantization is used for which the phase offset, depending on which quantization will yield better signal combining gain.

Figure 11:
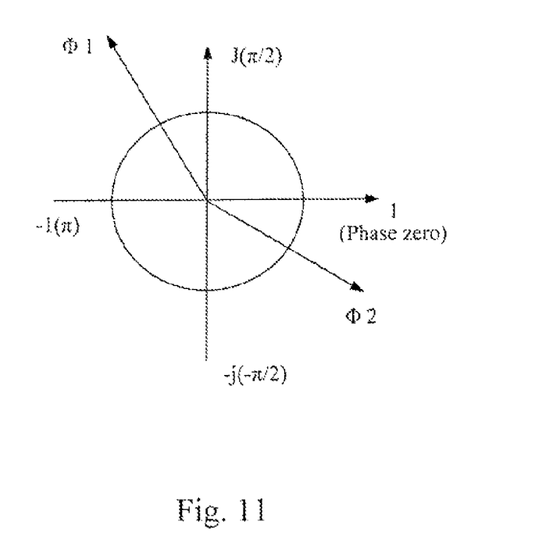
FIG. 11 shows an instance that two phase offsets with different values are quantized to complement each other.

FIG. 11 shows an instance that two phase offsets with different values are quantized to complement each other.

As shown in FIG. 11, it is assumed that one phase offset such as φ1 is close to π/2, and another phase offset such as φ2 is close to phase zero. In this case, according to the second embodiment of the present disclosure, if [1 −1] quantization is employed, the phase offsets φ1 and φ2 will be quantized to "−1" and "1" respectively; if [j −j] quantization is employed, the phase offsets φ1 and φ2 will be quantized to "j" and "−j", so that such quantization will result in the cancellation problem of the signal combining gain. However, according to the sixth embodiment of the present disclosure, the third bit is set to indicate that the phase offset φ1 employs [j −j] quantization, and the phase offset φ2 employs [1 −1] quantization. In this case, the phase offset φ1 is quantized to "j", and the phase offset φ2 is quantized to "1", the signal combining gain from the two transmission points are "(1 +j)/√2".

The two phase offsets with different values have some other instances, which will not be described herewith in details.

Therefore, in the sixth embodiment, totally three bits are used to feedback two phase offsets, which can also improve the signal combining gain from multiple transmission points with minimum overhead increasing.

Seventh Embodiment

According to the seventh embodiment of the present disclosure, the user equipment 600 reports two phase offsets by five bits, in which one phase offset is quantized to [1 j −1 −j] by two bits, another phase offset is quantized to [1 j −1 −j]*(1 +j)/√2 by two bits, and the fifth bit is used for deciding which phase offset is quantized to [1 j −1 −j].

Figure 12:
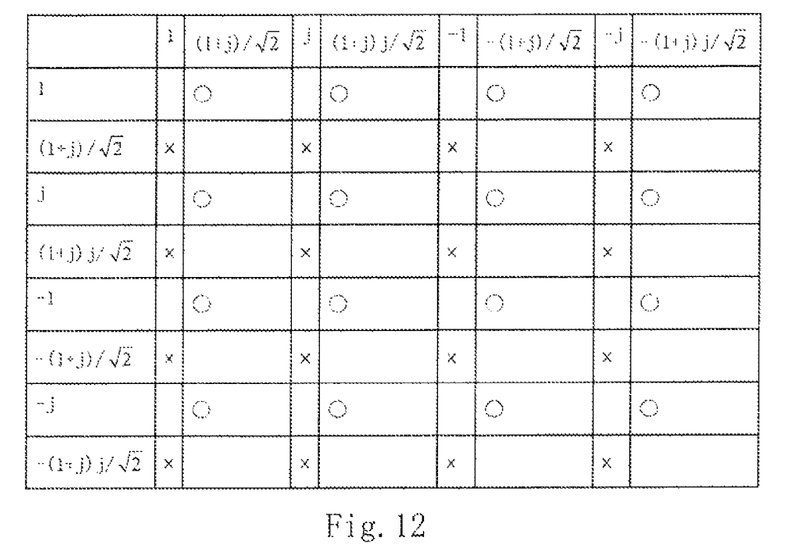
FIG. 12 is another table showing quantization and constellation of the phase offsets.

FIG. 12 is another table showing quantization and constellation of the phase offsets.

As shown in FIG. 12, it is assumed that the horizontal direction indicates phase offset φ1, and the vertical direction indicates phase offset φ2. In the seventh embodiment, if one phase offset such as φ1 is quantized to [1 j −1 −j] by two bits, the other phase offset such as φ2 is quantized to [1 j −1 −j]*(1 +j)/√2 by two bits, as shown with the symbol "x" in FIG. 12. On the other hand, if one phase offset such as φ2 is quantized to [1 j −1 −j] by two bits, the other phase offset such as φ1 is quantized to [1 j −1 −j]*(1 +j)/√2 by two bits, as shown with the symbol "○" in FIG. 12.

The third bit is used for deciding which phase offset is quantized to [1 j −1 −j]. That is, the third bit is used for deciding which one of [1 j −1 −j] quantization and [1 j −1 −j]*(1 +j)/√2 quantization is used for which phase offset, depending on which quantization will yield better signal combining gain.

The present embodiment is actually a combination of the third embodiment and the sixth embodiment, so the details will not be described herewith for purpose of simplicity.

In the seventh embodiment, totally five bits are used to feedback two phase offsets, in which two bits are used to quantize the first phase offset, another two bits are used to quantize the second phase offset, and fifth bit is used for selection of the quantization constellations [1 j −1 −j] and [1 j −1 −j]*(1 +j)/√2. Thereby, the seventh embodiment much more improves the signal combining gain from multiple transmission points with not much overhead increasing.

Eighth Embodiment

According to the eighth embodiment of the present disclosure, the user equipment 600 reports three phase offsets by four bits, in which one phase offset is quantized to [1 −1] by one bit, another phase offset is quantized to [j −j] by one bit, the third phase offset is quantized to either [1 −1] or [j −j] by one bit, and the fourth bit is used for deciding which phase offset is quantized to [1 −1].

Specifically, it is assumed that the three phase offsets are φ1, φ2 and φ3 respectively. In the eighth embodiment, on one hand, if a phase offset such as φ1 is quantized to [1 −1] by one bit, another phase offset such as φ2 or φ3 is quantized to [j −j] by one bit, and the third phase offset such as φ3 or φ2 is quantized to either [1 −1] or [j −j] by one bit. On the other hand, if a phase offset such as φ2 or φ3 is quantized to [1 −1] by one bit, another phase offset such as φ3 or φ2 is quantized to [j −j] by one bit, and the third phase offset such as φ1 is quantized to either [1 −1] or [j −j] by one bit, etc.

The fourth bit is used for deciding which phase offset is quantized to [1 −1]. That is, the fourth bit is used for deciding which one of [1 −1] quantization and [j −j] quantization is used for which phase offset, depending on which quantization will yield better signal combining gain.

The present embodiment is actually a combination of the fourth embodiment and the sixth embodiment, so the details will not be described herewith in details for the purpose of simplicity.

Therefore, in the eighth embodiment, totally four bits are used to feedback three phase offsets, in which one bit is used to quantize the first phase offset, another bit is used to quantize the second phase offset, the third bit is used to quantize the third phase offset, and fourth bit is used for selection of the quantization constellations [1 −1] and [j −j]. Thereby, the eighth embodiment improves the signal combining gain from multiple transmission points with minimum overhead increasing.

Ninth Embodiment

According to the ninth embodiment of the present disclosure, the user equipment 600 reports three phase offsets by seven bits, in which one phase offset is quantized to [1 j −1 −j] by two bits, another phase offset is quantized to [1 j −1 −j]*(1 +j)/√2 by two bits, the third phase offset is quantized to either [1 j −1 −j] or [1 j −1 −j]*(1 +j)/√2 by two bits, and the seventh bit is used for deciding which phase offset is quantized to [1 j −1 −j].

Specifically, it is assumed that the three phase offsets are φ1, φ2 and φ3 respectively. In the ninth embodiment, on one hand, if a phase offset such as φ1 is quantized to [1 j −1 −j] by two bits, another phase offset such as φ2 or φ3 is quantized to [1 j −1 −j]*(1 +j)/√2 by two bits, and the third phase offset such as φ3 or φ2 is quantized to either [1 j −1 −j] or [1 j −1 −j]*(1 +j)/√2 by two bits. On the other hand, if a phase offset such as φ2 or φ3 is quantized to [1 j −1 −j] by two bits, another phase offset such as φ3 or φ2 is quantized to [1 j −1 −j]*(1 +j)/√2 by two bits, and the third phase offset such as φ1 is quantized to either [1 j −1 −j] or [1 j −1 −j]*(1 +j)/√2 by two bits, etc.

The seventh bit is used for deciding which phase offset is quantized to [1 j −1 −j]. That is, the seventh bit is used for deciding which one of [1 j −1 −j] quantization and [1 j −1 −j]*(1 +j)/√2 quantization is used for which phase offset, depending on which quantization will yield better signal combining gain.

The present embodiment is actually a combination of the fifth embodiment and the sixth embodiment, so the details will not be described herewith for the purpose of simplicity.

Therefore, in the ninth embodiment, totally seven bits are used to feedback three phase offsets, in which two bits are used to quantize the first phase offset, another two bits are used to quantize the second phase offset, the third two bits are used to quantize the third phase offset, and seventh bit is used for selection of the quantization constellations [1 j −1 −j] and [1 j −1 −j]*(1 +j)/√2. Thereby, the ninth embodiment much more improves the signal combining gain from multiple transmission points with not much overhead increasing.

Tenth Embodiment

In the above embodiments 1-9, it is described that the reporting unit 602 of the user equipment 600 reports the quantized phase offsets and the constellation of the phase offsets to the transmission point. In the present embodiment, the periods for reporting the phase offsets and the constellation of the phase offsets can be set so as to decrease the feedback overhead.

According to one example of the present embodiment, the constellation of the phase offsets is reported less frequently than the reporting of the phase offsets. Specifically, the phase offsets may be reported from the reporting unit 602 of the user equipment 600 to a transmission point once per 5 sub-frames, but the constellation of the phase offsets may be reported once per 20 sub-frames. In such a way, the period for reporting constellation of the phase offsets is set longer than that for reporting the phase offsets, so that the overhead for reporting the constellation of the phase offsets is decreased.

The specific values set for the period for reporting the phase offsets and the constellation of phase offsets do not limit the scope of the present disclosure, those skills in the art can set the specific values according to the specific requirements of the communication system.

Eleventh Embodiment

According to the eleventh embodiment of the present disclosure, a communication system may comprise multiple cells (transmission points) and multiple user equipments. The cells may include a serving cell which provides service for the user equipments, as well as neighbor cells of the serving cell. Transmission point communicating with the user equipments can be considered as the serving cell or the neighbor cells.

Figure 13:
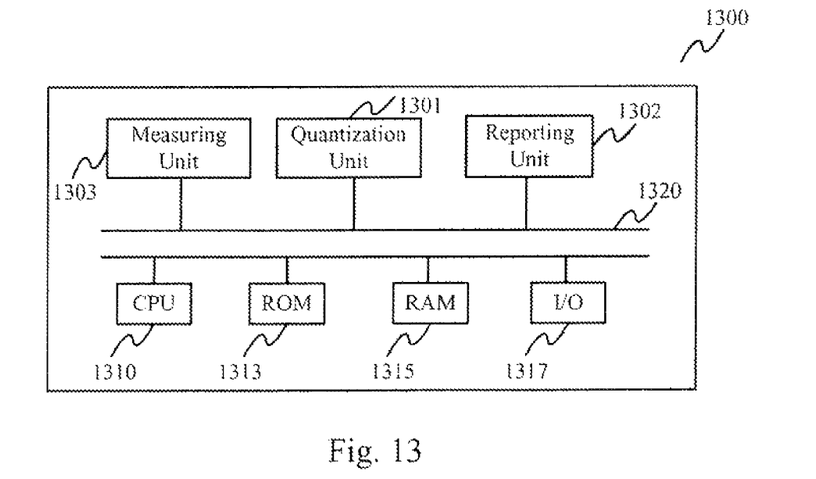
FIG. 13 is a diagram showing configuration of the user equipment according to the eleventh embodiment of the present disclosure.

FIG. 13 is a diagram showing configuration of the user equipment according to the eleventh embodiment of the present disclosure.

As shown in FIG. 13, the user equipment 1300 which reports phase offsets between signals received from a serving cell and neighbor cells in a communication system may include a measuring unit 1303, a quantization unit 1301, and a reporting unit 1302. The measuring unit 1303 measures channel quality indicators (CQI) of the neighbor cells. If CQI of a first neighbor cell is much higher than that of a second neighbor cell, the quantization unit 1301 quantizes the phase offset of the first neighbor cell using more bits than that of the second neighbor cell, and the reporting unit 1302 reports the quantized phase offsets to transmission point. If CQIs of the first neighbor cell and the second neighbor cell are close to each other, the quantization unit 1301 quantizes the phase offsets of the first neighbor cell and the second neighbor cell using the same number of bits, and utilizes another bit to indicate constellation of the phase offsets, and the reporting unit 1302 reports the quantized phase offsets and the constellation to the transmission point.

That is, the present embodiment may switch among different quantization operations based on the reported CQI of each neighbor cell, in which for the neighbor cell with a much higher CQI, its phase offset is quantized with more bits (better granularity).

The user equipment 1300 according to the eleventh embodiment of the present disclosure may further include a CPU (Central Processing Unit) 1310 for executing related programs to process various data and control operations of respective units in the user equipment 1300, a ROM (Read Only Memory) 1313 for storing various programs required for performing various process and control by the CPU 1310, a RAM (Random Access Memory) 1315 for storing intermediate data temporarily produced in the procedure of process and control by the CPU 1310, and/or a I/O unit 1317 for inputting and/or outputting various data with external apparatus outside the user equipment 1300. The above quantization unit 1301, reporting unit 1302, measuring unit 1303, CPU 1310, ROM 1313, RAM 1315 and/or I/O unit 1317 have respective ports to be interconnected via a data and/or command bus 1320 and transfer data (signal) with one another.

Respective units as described above do not limit the scope of the present disclosure. According to one embodiment of the disclosure, the function of any of the above quantization unit 1301, reporting unit 1302, and measuring unit 1303 may also be implemented by functional software in combination with the above CPU 1310, ROM 1313, RAM 1315 and/or I/O unit 1317 etc.

Thereby, the eleventh embodiment may improve the signal combining gain from multiple transmission points with minimum overhead increasing.

Twelfth Embodiment

According to the twelfth embodiment of the present disclosure, when the CQI of the first neighbor cell measured by the measuring unit 1303 is much higher than the CQI of the second neighbor cell measured by the measuring unit 1303, the quantization unit 1301 quantizes the phase offset of the first neighbor cell using more bits than that of the second neighbor cell, and the reporting unit 1302 reports the quantized phase offsets to the transmission point. Specifically, the user equipment 1300 may report two phase offsets by three bits, wherein the phase offset of one of the neighbor cells is quantized to [1 j −1 −j] by two bits, and the phase offset of another neighbor cell is quantized to [1 −1] or [j −j] by one bit.

Figure 14:
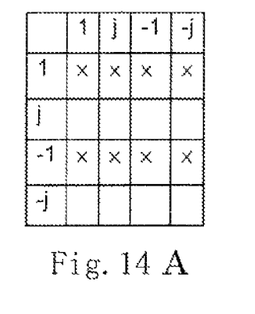
FIG. 14A and FIG. 14B are tables showing quantization of the phase offsets.

FIG. 14A and FIG. 14B are tables showing quantization of the phase offsets.

As shown in FIG. 14A, it is assumed that the horizontal direction indicates phase offset $\phi1$, and the vertical direction indicates phase offset $\phi2$. According to one example of the twelfth embodiment, when the CQI of the first neighbor cell is much higher than the CQI of the second neighbor cell, the phase offset $\phi1$ of the first neighbor cell is quantized to [1 j −1 −j] by two bits, and the phase offset $\phi2$ of the second neighbor cell is quantized to either [1 −1] or [j −j] by one bit, as shown with the symbol "x" in FIG. 14A.

As shown in FIG. 14B, it is assumed that the horizontal direction indicates phase offset $\phi1$, and the vertical direction indicates phase offset $\phi2$. According to another example of the twelfth embodiment, when the CQI of the first neighbor cell is much lower than the CQI of the second neighbor cell, the phase offset $\phi1$ of the first neighbor cell is quantized to either [1 −1] or [j −j] by one bit, and the phase offset $\phi2$ of the second neighbor cell is quantized to [1 j −1 −j] by two bits, as shown with the symbol "x" in FIG. 14B.

Thereby, the twelfth embodiment may improve the signal combining gain from multiple transmission points with minimum overhead increasing.

Thirteenth Embodiment

According to the thirteenth embodiment of the present disclosure, when the CQI of the first neighbor cell measured by the measuring unit 1303 is close to the CQI of the second neighbor cell measured by the measuring unit 1303, the quantization unit 1301 quantizes the phase offsets of the first neighbor cell and the second neighbor cell with the same number of bits, and utilizes another bit to indicate constellation of the phase offsets, and the reporting unit 1302 reports the quantized phase offsets and the constellation to the transmission point. Specifically, according to one example of the present embodiment, the user equipment 1300 may report two phase offsets by three bits, in which both the phase offsets of the first neighbor cell and the second neighbor cell are quantized to either [1 −1] or [j −j], each of the phase offsets uses one bit, and a third bit is used for selecting the constellation [1 −1] or [j −j]. The present example is the same as the operations of the second embodiment, as shown in FIG. 7, the details of which will not be provided herewith in details for simplicity.

According to another example of the present embodiment, the user equipment may report two phase offsets by three bits, in which one phase offset is quantized to [1 −1] by one bit, another phase offset is quantized to [j −j] by one bit, and the third bit is used for deciding which phase offset is quantized to [1 −1]. The present example is the same as the operations of the sixth embodiment, as shown in FIG. 10, the details of which will not be provided herewith in details for simplicity.

In addition, when the CQI of the first neighbor cell measured by the measuring unit 1303 is close to the CQI of the second neighbor cell measured by the measuring unit 1303, any one of the second embodiment to the ninth embodiment could be used by the quantization unit 1301 of the user equipment 1300, the details of which will not be provided herewith for the purposes of simplicity.

Thereby, the thirteenth embodiment may improve the signal combining gain from multiple transmission points with minimum overhead increasing.

Fourteenth Embodiment

Figure 15:
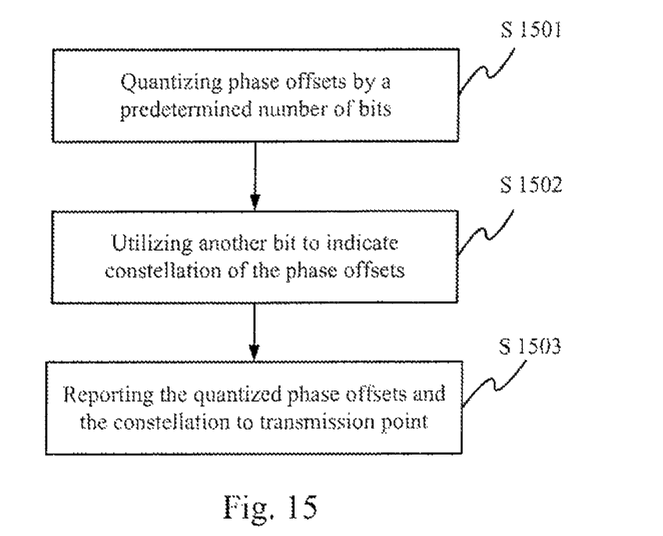
FIG. 15 is a diagram showing a flowchart of the method of reporting phase offsets between signals received from a serving cell and neighbor cells in a communication system according to the fourteenth embodiment of the present disclosure.

FIG. 15 is a diagram showing a flowchart of a method of reporting phase offsets between signals received from serving cell and neighbor cells in a communication system according to the fourteenth embodiment of the present disclosure.

As shown in FIG. 15, in the step S1501, the phase offsets are quantized by a predetermined number of bits. In the step S1502, another bit is utilized to indicate constellation of the phase offsets. In the step S1503, the quantized phase offsets and the constellation are reported to transmission point.

According to the present embodiment, the above steps S1501 and S1502 can be executed by the quantization unit 601 or 1301, the above step S1503 can be executed by the reporting unit 602 or 1302.

The above method of the present embodiment may further comprise a step of reporting two phase offsets by three bits, in which both the phase offsets are quantized to either [1 −1] or [j −j], each of the phase offsets uses one bit, and the third bit is used for selecting the constellation [1 −1] or [j −j].

The above method of the present embodiment may further comprise a step of reporting two phase offsets by five bits, in which both the phase offsets are quantized to either [1 j −1 −j] or [1 j −1 −j]*(1 +j)/√2, each of the phase offsets uses two bits, and the fifth bit is used for selecting the constellation [1 j −1 −j] or [1 j −1 −j]*(1 +j)/√2.

The above method of the present embodiment may further comprise a step of reporting three phase offsets by four bits, in which all the three phase offsets are quantized to either [1 −1] or [j −j], each of the phase offsets uses one bit, and the fourth bit is used for selecting the constellation [1 −1] or [j −j].

The above method of the present embodiment may further comprise a step of reporting three phase offsets by seven bits, in which all the three phase offsets are quantized to either [1 j −1 −j] or [1 j −1 −j]*(1 +j)/√2, each of the phase offsets uses two bits, and the seventh bit is used for selecting the constellation [1 j −1 −j] or [1 j −1 −j]*(1 +j)/√2.

The above method of the present embodiment may further comprise a step of reporting two phase offsets by three bits, in which one phase offset is quantized to [1 −1] by one bit, another phase offset is quantized to [j −j] by one bit, and the third bit is used for deciding which phase offset is quantized to [1 −1].

The above method of the present embodiment may further comprise a step of reporting two phase offsets by five bits, in which one phase offset is quantized to [1 j −1 −j] by two bits, another phase offset is quantized to [1 j −1 −j]*(1 +j)/√2 by two bits, and the fifth bit is used for deciding which phase offset is quantized to [1 j −1 −j].

The above method of the present embodiment may further comprise a step of reporting three phase offsets by four bits, in which one phase offset is quantized to [1 −1] by one bit, another phase offset is quantized to [j −j] by one bit, the third phase offset is quantized to either [1 −1] or [j −j] by one bit, and the fourth bit is used for deciding which phase offset is quantized to [1 −1].

The above method of the present embodiment may further comprise a step of reporting three phase offsets by seven bits, in which one phase offset is quantized to [1 j −1 −j] by two bits, another phase offset is quantized to [1 j −1 −j]*(1 +j)/√2 by two bits, the third phase offset is quantized to either [1 j −1 −j] or [1 j −1 −j]*(1 +j)/√2 by two bits, and the seventh bit is used for deciding which phase offset is quantized to [1 j −1 −j].

The above method of the present embodiment may further comprise a step of reporting the constellation of the phase offsets less frequently than the reporting of the phase offsets.

According to the present embodiment, the above steps can be executed by the quantization unit 601, 1301 and/or the reporting unit 602, 1302 respectively.

Thereby, the fourteenth embodiment may improve the signal combining gain from multiple transmission points with minimum overhead increasing.

Fifteenth Embodiment

Figure 16:
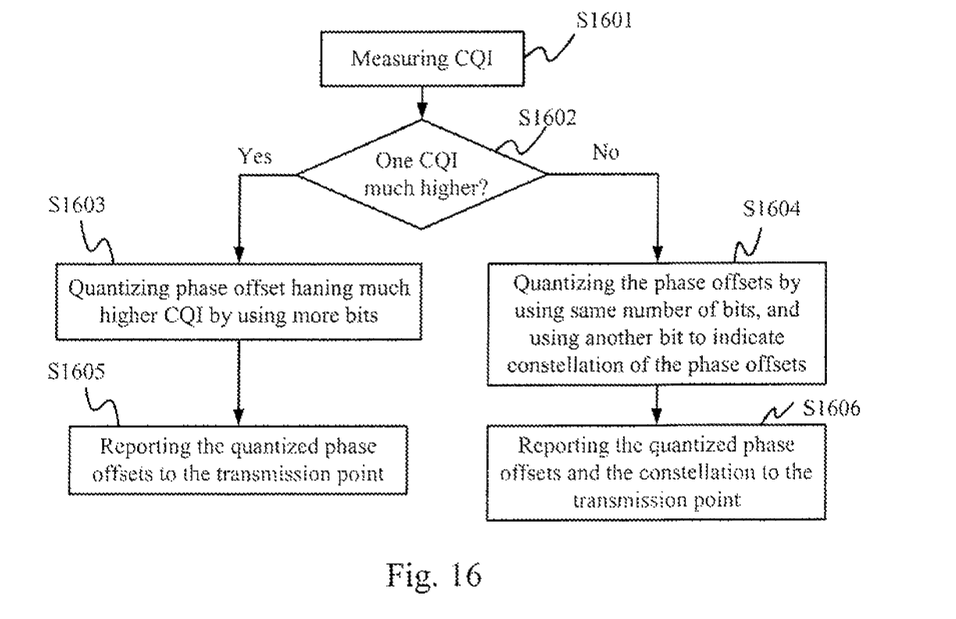
FIG. 16 is another diagram showing a flowchart of the method of reporting phase offsets between signals received from a serving cell and neighbor cells in a communication system according to the fifteenth embodiment of the present disclosure.

FIG. 16 is another diagram showing a flowchart of a method of reporting phase offsets between signals received from serving cell and neighbor cells in a communication system according to the fifteenth embodiment of the present disclosure.

As shown in FIG. 16, in the step S1601, the channel quality indicators (CQI) of the neighbor cells are measured. In the step S1602, it is decided whether or not the CQI of one neighbor cell is much higher than the CQI of another neighbor cell. When the answer in the step S1602 is confirmative, i.e., the CQI of one neighbor cell is much higher than the CQI of another neighbor cell, the flowchart proceeds to step S1603, otherwise, when the answer in the step S1602 is negative, i.e., the CQI of one neighbor cell is close to the CQI of another neighbor cell, the flowchart proceeds to step S1604.

In the step S1603, the phase offset of the neighbor cell with much higher CQI is quantized by using more bits than that of the other neighbor cell with much lower CQI. In the step S1605, the quantized phase offsets are reported to the transmission point.

In the step S1604, the phase offsets of the first neighbor cell and the second neighbor cell are quantized by using the same number of bits, and another bit is used to indicate constellation of the phase offsets. In the step S1606, the quantized phase offsets and the constellation of the phase offsets are reported to the transmission point.

According to the present embodiment, the above steps S1601 and S1602 can be executed by the measuring unit 1303, the above steps S1602, S1603, and S1604 can be executed by the quantization unit 601 or 1301, and the above steps S1605 and S1606 can be executed by the reporting unit 602 or 1302.

The above method of the present embodiment may further comprise a step of reporting two phase offsets by three bits, in which the phase offset of one of the neighbor cells is quantized to [1 j −1 −j] by two bits, and the phase offset of another neighbor cell is quantized to [1 −1] or [j −j] by one bit.

The above method of the present embodiment may further comprise a step of reporting two phase offsets by three bits, in which both the phase offsets are quantized to either [1 −1] or [j −j], each of the phase offsets uses one bit, and a third bit is used for selecting the constellation [1 −1] or [j −j].

The above method of the present embodiment may further comprise a step of reporting two phase offsets by three bits, in which one phase offset is quantized to [1 −1] by one bit, another phase offset is quantized to [j −j] by one bit, and the third bit is used for deciding which phase offset is quantized to [1 −1].

According to the present embodiment, the above steps can be executed by the quantization unit 601, 1301, the reporting unit 602, 1302 and the measuring unit 1303, respectively.

Thereby, the fifteenth embodiment may improve the signal combining gain from multiple transmission points with minimum overhead increasing.

Sixteenth Embodiment

According to the sixteenth embodiment of the present disclosure, a communication system may comprise multiple cells (transmission point devices) and multiple user equipments. The cells may include a serving cell which provides service for the user equipment, as well as neighbor cells of the serving cell. Transmission point (device) communicating with the user equipment can be considered as the serving cell or the neighbor cells.

Figure 17:
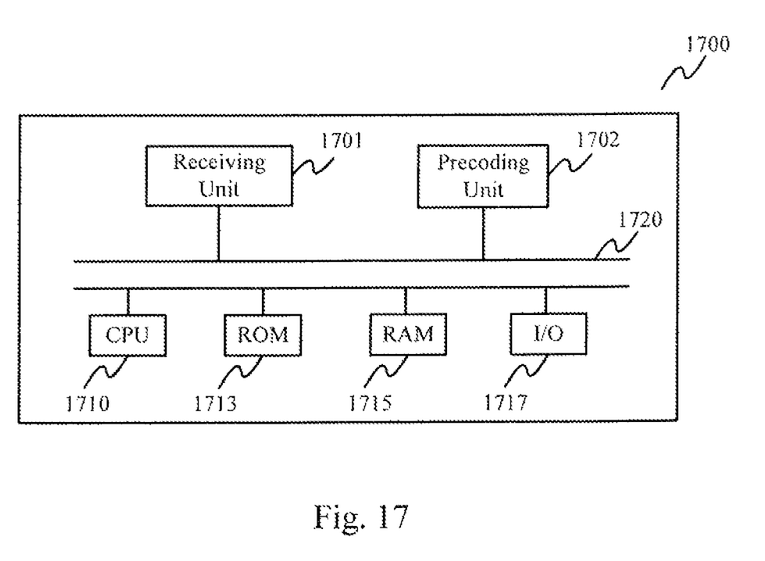
FIG. 17 is a diagram showing configuration of the transmission point device according to the sixteenth embodiment of the present disclosure.

FIG. 17 is a diagram showing configuration of the transmission point device according to the sixteenth embodiment of the present disclosure.

As shown in FIG. 17, the transmission point device 1700 may include a receiving unit 1701 and a precoding unit 1702. The receiving unit 1701 receives information reported from the user equipment, the information may include the phase offsets between signals transmitted from the transmission point device and neighbor transmission point devices to the user equipment, and constellation of the phase offsets, wherein the phase offsets are quantized by using a predetermined number of bits, and the constellation is indicated by another bit. The precoding unit 1702 precodes the signals to be transmitted to the user equipment with the quantized phase offsets and the constellation.

The transmission point device 1700 according to the sixteenth embodiment of the present disclosure may further include a CPU (Central Processing Unit) 1710 for executing related programs to process various data and control operations of respective units of the transmission point device 1700, a ROM (Read Only Memory) 1713 for storing various programs required for performing various process and control by the CPU 1710, a RAM (Random Access Memory) 1715 for storing intermediate data temporarily produced in the procedure of process and control by the CPU 1710, and/or a I/O unit 1717 for inputting and/or outputting various data with external apparatus outside the transmission point device 1700. The above receiving unit 1701, precoding unit 1702, CPU 1710, ROM 1713, RAM 1715 and/or I/O unit 1717 have respective ports interconnected via a data and/or command bus 1720 and transfer data (signal) with one another.

Respective units as described above do not limit the scope of the present disclosure. According to one embodiment of the disclosure, the function of any of the above receiving unit 1701 and precoding unit 1702 may also be implemented by functional software in combination with the above CPU 1710, ROM 1713, RAM 1715 and/or I/O unit 1717 etc.

Thereby, the sixteenth embodiment may improve the signal combining gain from multiple transmission point devices with minimum overhead increasing.

The respective aforementioned embodiments 1-15 may be utilized in combination with the present embodiment, the details of which will not be provided herewith for the purpose of simplicity.

Seventeenth Embodiment

According to the seventeenth embodiment of the present disclosure, the receiving unit 1701 receives information reported from the user equipment, and the information may include the phase offsets between signals transmitted from the transmission point device 1700 and neighbor transmission point devices to the user equipment. In one example of the seventeenth embodiment, if CQI (Channel Quality Indicator-measured and calculated at the user equipment side) of a first neighbor transmission point device is much higher than that of a second neighbor transmission point device, the phase offset of the first neighbor transmission point device is quantized by using more bits than that of the second neighbor transmission point device at the user equipment side. The precoding unit 1702 precodes the signals to be transmitted to the user equipment with the quantized phase offsets.

In another example of the seventeenth embodiment, if CQIs of the first and the second neighbor transmission point devices measured at the user equipment side are close with each other, the phase offsets of the first and the second neighbor transmission point devices are quantized by using the same number of bits at the user equipment side, and another bit is used to indicate constellation of the phase offsets. The precoding unit 1702 precodes the signals to be transmitted to the user equipment with the quantized phase offsets and the constellation.

In the present embodiment, the quantization operations of the phase offsets may be switched based on the reported CQI of each neighbor cell, in which for the neighbor cell with a much higher CQI, its phase offset is quantized with more bits (better granularity). However, for the neighbor cells with the similar CQI, their phase offsets are quantized with the same number of bits, and another bit is used to indicate the constellation of the phase offsets.

Respective units as described above do not limit the scope of the present disclosure. According to one embodiment of the disclosure, the function of any of the above receiving unit 1701 and precoding unit 1702 may also be implemented by functional software in combination with the above CPU 1710, ROM 1713, RAM 1715 and/or I/O unit 1717 etc.

Thereby, the seventeenth embodiment may improve the signal combining gain from multiple transmission points with minimum overhead increasing.

The respective aforementioned embodiments 1-15 may be utilized in combination with the present embodiment, the details of which will not be provided herewith for the purpose of simplicity.

The above embodiments of the present disclosure are only exemplary description, and their specific structures and operations do not limit the scope of the disclosure. Those skilled in the art can combine different parts and operations in the above respective embodiments to produce new implementations which equally accord with the concept of the present disclosure.

The embodiments of the present disclosure may be implemented by hardware, software and firmware or in a combination thereof, and the way of implementation thereof does not limit the scope of the present disclosure.

The connection relationships between respective functional elements (units) in the embodiments of the present disclosure do not limit the scope of the present disclosure, in which one or multiple functional element(s) or unit(s) may contain or be connected to any other functional elements.

Although several embodiments of the present disclosure has been shown and described in combination with attached drawings as above, those skilled in the art should understand that variations and modifications which still fall into the scope of claims and their equivalents of the present disclosure can be made to the embodiments without departing from the principle and spirit of the disclosure.

What is claimed is:

1. A method of reporting phase offsets between signals received from serving cell and neighbor cells in a communication system, comprising steps of:
   quantizing the phase offsets using a predetermined number of bits;
   utilizing another bit to indicate constellation of the phase offsets; and
   reporting the quantized phase offsets and the constellation to transmission point.

2. The method of claim 1, further including a step of reporting two phase offsets by three bits, wherein both phase offsets are quantized to either [1 −1] or [j −j], each of the phase offsets uses one bit, and the third bit is used for selecting the constellation [1 −1] or [j −j].

3. The method of claim 1, further including a step of reporting two phase offsets by five bits, wherein both of the phase offsets are quantized to either [1 j −1 −j] or [1 j −1 −j]*(1 +j)/√2, each of the phase offsets uses two bits, and the fifth bit is used for selecting the constellation [1 j −1 −j] or [1 j −1 −j]*(1 +j)/√2.

4. The method of claim 1, further including a step of reporting three phase offsets by four bits, wherein all of the three phase offsets are quantized to either [1 −1] or [j −j], each of the phase offsets uses one bit, and the fourth bit is used for selecting constellation [1 −1] or [j −j].

5. The method of claim 1, further including a step of reporting three phase offsets by seven bits, wherein all of the three phase offsets are quantized to either [1 j −1 −j] or [1 j −1 −j]*(1 +j)/√2, each of the phase offsets uses two bits, and the seventh bit is used for selecting constellation [1 j −1 −j] or [1 j −1 −j]*(1 +j)/√2.

6. The method of claim 1, further including a step of reporting two phase offsets by three bits, wherein one phase offset is quantized to [1 −1] by one bit, another phase offset is quantized to [j −j] by one bit, and the third bit is used for deciding which phase offset is quantized to [1 −1].

7. The method of claim 1, further including a step of reporting two phase offsets by five bits, wherein one phase offset is quantized to [1 j −1 −j] by two bits, another phase offset is quantized to [1 j −1 −j]*(1 +j)/√2 by two bits, and the fifth bit is used for deciding which phase offset is quantized to [1 j −1 −j].

8. The method of claim 1, further including a step of reporting three phase offsets by four bits, wherein one phase offset is quantized to [1 −1] by one bit, another phase offset is quantized to [j −j] by one bit, the third phase offset is quantized to either [1 −1] or [j −j] by one bit, and the fourth bit is used for deciding which phase offset is quantized to [1 −1].

9. The method of claim 1, further including a step of reporting three phase offsets by seven bits, wherein one phase offset is quantized to [1 j −1 −j] by two bits, another phase offset is quantized to [1 j −1 −j]*(1 +j)/√2 by two bits, the third phase offset is quantized to either [1 j −1 −j] or [1 j −1 −j]*(1 +j)/√2 by two bits, and the seventh bit is used for deciding which phase offset is quantized to [1 j −1 −j].

10. The method of claim 1, wherein the constellation of the phase offsets is reported less frequently than the reporting of the phase offsets.

11. A method of reporting phase offsets between signals received from serving cell and neighbor cells in a communication system, comprising steps of:
    measuring channel quality indicators (CQI) of the neighbor cells;
    if CQI of a first neighbor cell is much higher than that of a second neighbor cell, quantizing the phase offset of the first neighbor cell using more bits than that of the second neighbor cell, and reporting the quantized phase offsets to a transmission point;
    if CQIs of the first and the second neighbor cells are close with each other, quantizing the phase offsets of the first and the second neighbor cells using the same number of bits, utilizing another bit to indicate constellation of the phase offsets, and reporting the quantized phase offsets and the constellation to the transmission point.

12. The method of claim 11, further including a step of reporting two phase offsets by three bits, wherein the phase offset of one of the neighbor cells is quantized to [1 j −1 −j] by two bits, and the phase offset of another neighbor cell is quantized to [1 −1] or [j −j] by one bit.

13. The method of claim 11, further including a step of reporting two phase offsets by three bits, wherein both of the phase offsets are quantized to either [1 −1] or [j −j], each of the phase offsets uses one bit, and the third bit is used for selecting the constellation [1 −1] or [j −j].

14. The method of claim 11, further including a step of reporting two phase offsets by three bits, wherein one phase offset is quantized to [1 −1] by one bit, another phase offset is quantized to [j −j] by one bit, and the third bit is used for deciding which phase offset is quantized to [1 −1].

15. A user equipment for reporting phase offsets between signals received from serving cell and neighbor cells in a communication system, comprising:
    a quantization unit which quantizes the phase offsets using a predetermined number of bits, and utilizes another bit to indicate constellation of the phase offsets;
    a reporting unit which reports the quantized phase offsets and the constellation to transmission point.

16. A user equipment for reporting phase offsets between signals received from serving cell and neighbor cells in a communication system, comprising:
- a measuring unit which measures channel quality indicators (CQI) of the neighbor cells,
- a quantization unit, which, if CQI of a first neighbor cell is much higher than that of a second neighbor cell, quantizes the phase offset of the first neighbor cell using more bits than that of the second neighbor cell;
- a reporting unit which reports the quantized phase offsets to a transmission point,
- wherein, if CQIs of the first and the second neighbor cells are close with each other, the quantization unit quantizes the phase offsets of the first and the second neighbor cells using the same number of bits, and utilizes another bit to indicate constellation of the phase offsets, and the reporting unit reports the quantized phase offsets and the constellation to the transmission point.

17. A transmission point device, comprising:
- a receiving unit which receives information reported from user equipment, the information including the phase offsets between signals transmitted from the transmission point device and neighbor transmission point devices, and constellation of the phase offsets, wherein the phase offsets being quantized by using a predetermined number of bits, and the constellation being indicated by another bit; and
- a precoding unit which precodes signals to be transmitted to the user equipment with the quantized phase offsets and the constellation.

18. A transmission point device, comprising:
- a receiving unit which receives information reported from user equipment, the information including the phase offsets between signals transmitted from the transmission point device and neighbor transmission point devices, wherein if CQI of a first neighbor transmission point device is much higher than that of a second neighbor transmission point device, the phase offset of the first neighbor transmission point device being quantized by using more bits than that of the second neighbor transmission point device; and
- a precoding unit which precodes signals to be transmitted to the user equipment with the quantized phase offsets,
- wherein, if CQIs of the first and the second neighbor transmission point devices are close with each other, the phase offsets of the first and the second neighbor transmission point devices being quantized by using the same number of bits, and another bit being used to indicate constellation of the phase offsets, and the precoding unit precodes the signals to be transmitted to the user equipment with the quantized phase offsets and the constellation.

* * * * *